(No Model.)
N. W. CONDICT, Jr.
REFRIGERATING APPARATUS.
No. 402,809.    Patented May 7, 1889.
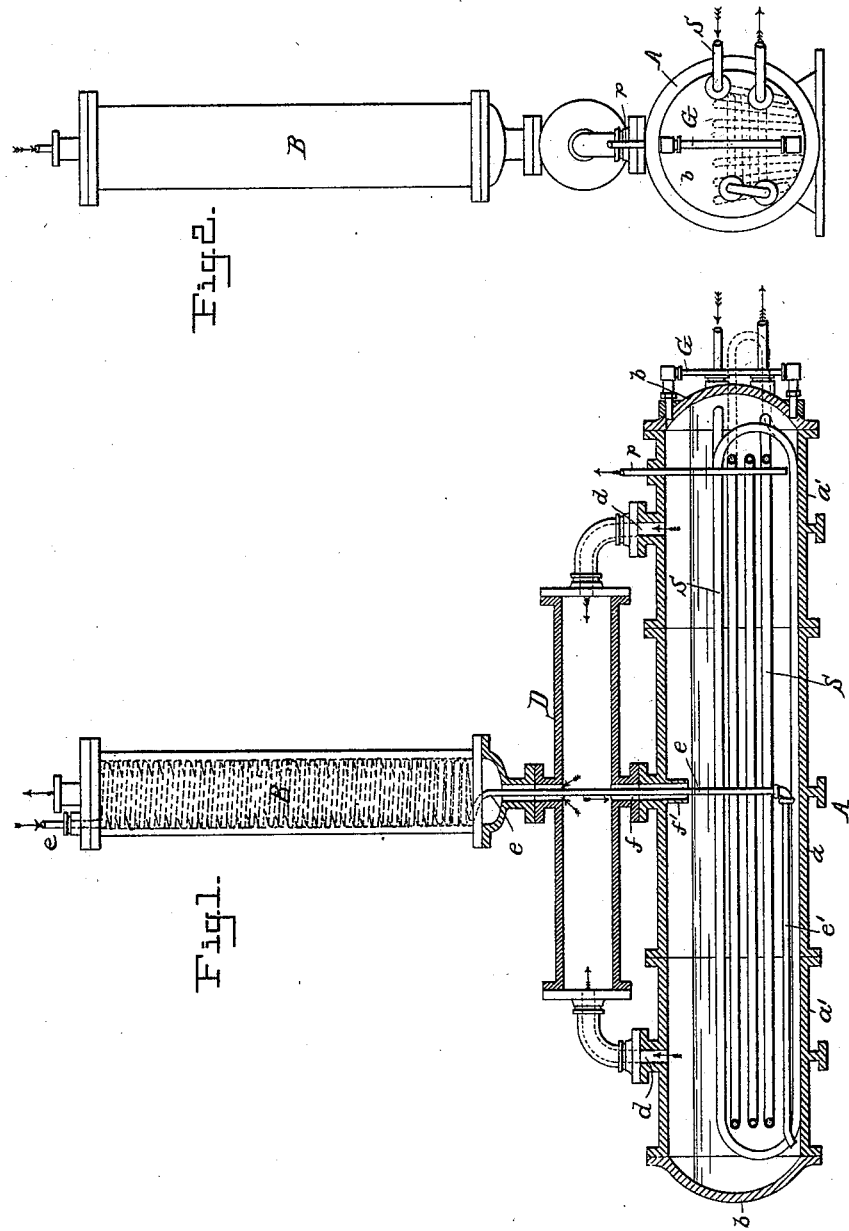
WITNESSES:
E. J. Griswold.
John Revell.
INVENTOR
N. W. Condict Jr
BY
Howson and Howson
his ATTORNEYS.

UNITED STATES PATENT OFFICE.

NATHAN W. CONDICT, JR., OF JERSEY CITY, NEW JERSEY.

REFRIGERATING APPARATUS.

SPECIFICATION forming part of Letters Patent No. 402,809, dated May 7, 1889.

Application filed July 23, 1888. Serial No. 280,848. (No model.)

*To all whom it may concern:*

Be it known that I, NATHAN W. CONDICT, Jr., a citizen of the United States, and a resident of Jersey City, New Jersey, have invented an Improved Refrigerating Apparatus, of which the following is a specification.

My invention consists of a simplified construction of the distilling devices for ice-making or refrigerating apparatus by the ammonia process.

In the accompanying drawings, Figure 1 is a side elevation of my improved apparatus, the still and some of the connected parts being in section, and Fig. 2 is an end elevation of the same.

I make the still A in the form of a simple horizontal cylinder, A, of sufficient capacity, and upon the still is centrally supported a reservoir, D, which receives the gas (on its way to the upright rectifier B) through passages forming communications between the ends of the cylindrical still and the ends of this reservoir, while the latter is also in communication with the still through the hollow leg $f$, which supports the reservoir. The rectifier B is supported in turn upon the reservoir, and may be of any convenient construction.

I prefer in practice to make the horizontal cylindrical still in sections—namely, a central section, $a$, and two end sections, $a'$, with heads $b$, which may be cast in one with the bodies of the end sections, although I have shown them as separate for being bolted thereto. By having these end sections of varying lengths, and by employing a varying number of sections, stills of varying lengths may be readily constructed.

From the upper part of the still, in the opposite end sections, extend the passages $d$, opening into the ends of the reservoir D, which is in the form of a horizontal cylinder. This reservoir is supported by the central hollow leg, $f$, which forms the communication with the center of the retort; but as I prefer that the gas generated in the retort should pass into the reservoir through the passages or pipes $d$, I provide a lip or tube, $f'$, extending from the hollow leg nearly to the top level of the liquid in the retort, as shown in Fig. 1. Any aqueous vapor which may be carried over into the reservoir D and condensed therein or in the rectifier can pass back through the hollow leg $f$ into the still. The gas from the reservoir D passes thence up into and through the rectifier B, which may be provided with a cooling coil or jacket, (not shown,) as it is a common appliance. In this rectifier the pipe $e$, which supplies the liquid ammonia from the absorber to the still, is coiled, as represented by dotted lines in Fig. 1, and the lower end of the pipe $e$ passes down through the reservoir D and leg $f$ into the still, where a horizontal branch, $e'$, opens into the bottom of the still at one end. From the opposite end of the retort, also at the bottom, leads an outlet-pipe, $p$, for the discharge of the weak water. By this arrangement I get a complete circulation. This supply-pipe $e$ for the strong ammonia from the absorber does not open into the rectifying-vessel, but is simply passed through this vessel in the form of a coil, as has been heretofore done.

S are the coils of steam-pipe for vaporizing the ammonia in the still, and which may be of any convenient form and arrangement.

G is a gage to indicate the level of liquid in the retort.

I have not shown or described the condenser, absorber, or freezing-tanks, and other appliances which go to make up the complete refrigerating apparatus, as they form no part of my present invention, and may be of any well-known construction.

The features of construction shown in this application and not claimed herein form the subject of a separate application for a patent filed by me March 7, 1889, Serial No. 302,268.

I claim as my invention—

In an apparatus for refrigerating, the combination of a still composed of a single horizontal cylinder with a gas-reservoir having a hollow leg supporting the reservoir and resting on the top of the said cylinder and communicating therewith, and passages forming communications between the ends of the cylinder and the ends of the reservoir, substantially as described.

In testimony whereof I have signed my name to this specification in the presence of two subscribing witnesses.

N. W. CONDICT, JR.

Witnesses:
 HUBERT HOWSON,
 GEO. A. CRANE.